J. T. SHIMER.
Carriage Wheel.
No. 81,545.
Patented Aug. 25, 1868.
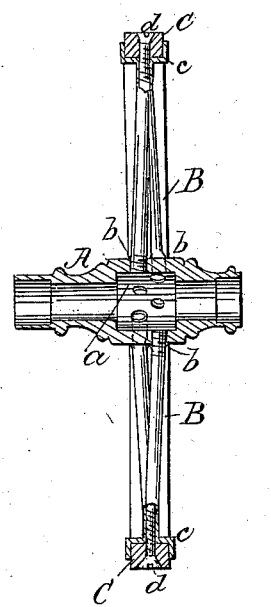

UNITED STATES PATENT OFFICE.

JACOB T. SHIMER, OF EASTON, PENNSYLVANIA.

IMPROVEMENT IN CARRIAGE-WHEELS.

Specification forming part of Letters Patent No. 81,545, dated August 25, 1868.

*To all whom it may concern:*

Be it known that I, JACOB T. SHIMER, of Easton, in the county of Northampton and State of Pennsylvania, have invented a new and useful Improvement in Wheels for Vehicles; and I do hereby declare that the following is a full, clear, and exact description thereof, which will enable others skilled in the art to make and use the same, reference being had to the accompanying drawings, forming part of this specification, in which—

Figure 1 is a central section of my invention, the plane of section bisecting the hub longitudinally. Fig. 2 is a detached view of the axle of the wheel.

Similar letters of reference indicate corresponding parts.

This invention relates to a new and useful improvement in the construction of wheels for vehicles.

It consists in having the spokes of the wheel formed of iron tubes, the inner ends of which are screwed into a cast-iron hub, malleableized, the spokes, near their outer ends, being provided with washers, to serve as bearings or sockets for the rim of the wheel, which is secured to the outer ends of the spokes by screws, as hereinafter fully shown and described.

In the accompanying sheet of drawings, A represents the hub of the wheel, which is of malleable cast-iron, and is cast with, or has made in it, an annular groove, $a$, to serve as an oil-chamber. (See Fig. 1.) B represents the spokes of the wheel, which are formed of wrought-iron tubes of suitable diameter, having screw-threads cut on their inner ends, so that they may be screwed into holes in the hub, the latter being drilled entirely through to its bore, or to the oil-chamber $a$, so that the spokes may all communicate with the latter.

The inner ends or parts of the spokes above the screw are formed with a shoulder, $b$, so that the spokes may have a proper bearing against the hub. (See Fig. 1.) On the spokes, near their outer ends, there are secured washers or sockets $c$, to receive the wooden rim C of the wheel; and the rim is firmly secured in position by screws $d$, which pass through the rim and into the ends of the spokes, the interior of the outer parts of the same being tapped to receive the screws.

The tire (not shown) may be secured on the rim in the usual or any proper way. The hub is secured on the axle D by means of a nut, $e$, as usual.

By this mode of construction a very strong and durable wheel is obtained, and one which may be made nearly or quite as cheap as the ordinary wooden ones. The tubular spokes serve as oil-receptacles, as they communicate with the oil-chamber $a$, and consequently a large amount of oil or other suitable lubricating material may be retained within the wheel, and the axle kept in a properly-lubricated state a long time.

I would remark that brass boxes, or malleable cast-iron ones, may be inserted in the hubs, and secured in any proper manner.

Having thus described my invention, I claim as new and desire to secure by Letters Patent—

The combination of the wrought-iron spokes B B, threaded at each end, with the cast-iron hub A, having screw-thread perforations, and the wooden rim C, angular plates $c$, and screws $d$, all arranged together in the manner set forth.

JACOB T. SHIMER.

Witnesses:
JACOB SEIGLE,
HENRY M. CYPHUS.